United States Patent [19]
Yano et al.

[11] Patent Number: 4,824,813
[45] Date of Patent: * Apr. 25, 1989

[54] DIELECTRIC CERAMIC COMPOSITION

[75] Inventors: Shinsuke Yano; Susumu Nishigaki; Hiroshi Kato; Toshio Nonomura, all of Nagoyo, Japan

[73] Assignee: Narumi China Corporation, Nagoya, Japan

[*] Notice: The portion of the term of this patent subsequent to Jun. 7, 2005 has been disclaimed.

[21] Appl. No.: 134,008

[22] Filed: Dec. 17, 1987

[30] Foreign Application Priority Data

Dec. 27, 1986 [JP] Japan .................. 61-315249

[51] Int. Cl.$^4$ ........................................... C04B 35/46
[52] U.S. Cl. ........................................ 501/139; 501/138
[58] Field of Search ..................... 501/134–139; 252/520, 521

[56] References Cited

U.S. PATENT DOCUMENTS

| | | | |
|---|---|---|---|
| 3,195,030 | 7/1965 | Herczog et al. | 501/137 |
| 3,426,249 | 2/1969 | Smyth | 252/520 |
| 3,637,532 | 1/1972 | Ramisch et al. | 252/520 |
| 4,284,521 | 8/1981 | Payne et al. | 252/623 |
| 4,581,159 | 4/1986 | Hennings et al. | 252/520 |
| 4,606,116 | 8/1986 | Hennings et al. | 29/610 R |
| 4,692,289 | 8/1987 | Hennings et al. | 264/61 |
| 4,749,669 | 6/1988 | Nishigaki et al. | 501/139 |

FOREIGN PATENT DOCUMENTS

| | | | |
|---|---|---|---|
| 2941304 | 4/1980 | Fed. Rep. of Germany | 501/137 |
| 50-132493 | 10/1975 | Japan | 501/137 |
| 55-100606 | 7/1980 | Japan | 501/137 |
| 60-42802 | 3/1985 | Japan | 501/137 |
| 907719 | 10/1962 | United Kingdom | 501/139 |

Primary Examiner—William R. Dixon, Jr.
Assistant Examiner—Ann M. Knab
Attorney, Agent, or Firm—Flynn, Thiel, Boutell & Tanis

[57] ABSTRACT

A dielectric ceramic composition consisting essentially of a $BaO\text{-}TiO_2\text{-}WO_3$ ternary system wherein molar percentages of $BaO$, $TiO_2$ and $WO_3$ are within the range enclosed by a line joining the points of A(21.5, 78.5, 0), B(40.0, 30.0, 30.0), C(37.0, 30.0, 33.0), D(20.0, 75.0, 5.0), E(21.5, 75.0, 3.5) and A of a composition diagram shown in the attached FIGURE, the range excluding molar percentages of $BaO$, $TiO_2$ and $WO_3$ laying on a line joining said points A, E and D. In the dielectric ceramic composition, up to 10 mole % of $TiO_2$ may be replaced by tetravalent metal oxide and, further, MnO is contained in amounts of 3 mole % or less with respect to 100 mole % of the sum of $BaO$, $TiO_2$ and $WO_3$. Since the dielectric ceramic composition has a beneficial combination of dielectric properties, particularly a high Q, properly small dielectric constant and sufficiently small temperature coefficient of resonant frequency, $\tau_f$, and $\tau_f$, can be adjusted to a desired value in the vicinity of 0 ppm/°C., it is especially greatly useful at the microwave range.

14 Claims, 1 Drawing Sheet

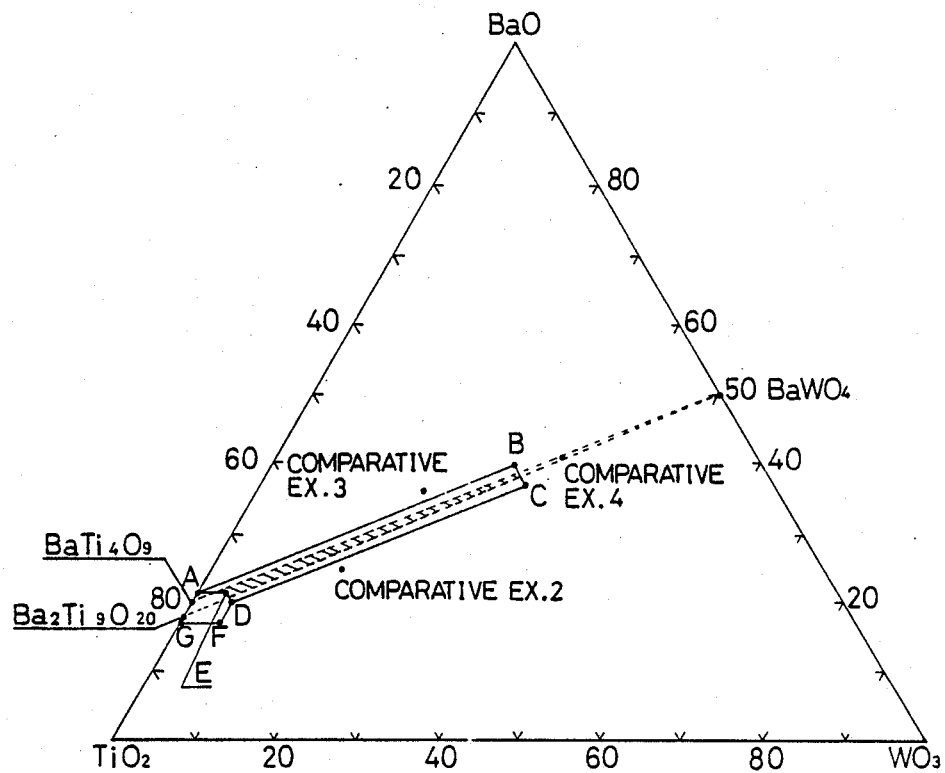
FIGURE

DIELECTRIC CERAMIC COMPOSITION

BACKGROUND OF THE INVENTION

1. Field of the Invention

The present invention relates to a dielectric composition, especially suitable for microwave applications, which contains three components of BaO, $TiO_2$ and $WO_3$ as main components.

2. Description of the Prior Art

In recent years, dielectrics having a high dielectric constant, a low dielectric loss and a low temperature coefficient of resonant frequency have been used in the microwave region, for example, resonators and have been expanding their practical utility in microwave communication or broadcasting apparatus, for example, in car telephone systems or satellite broadcasting receivers.

Heretofore, in such applications, there have been known $BaO-TiO_2$ system dielectric ceramics. For instance, dielectric ceramics having a composition of $Ba_2Ti_9O_{20}$ are described in detail in Japanese Patent Publication No. 58-20 905. Dielectric ceramics with a composition of $BaTi_4O_9$ have been also reported.

Further, there has been known dielectric ceramics of the composite perovskite type and $Ba(Zn_{1/3}Ta_{2/3})O_3$ proposed in Japanese Patent Application Laid-Open No. 53-35 454 may be mentioned as a representative example of such a type.

However, the aforesaid known dielectric ceramic materials have problems in the microwave applications. For example, $Ba_2Ti_9O_{20}$ can not be satisfactorily used without complicated special treatments. In the preparation of the dielectric ceramics with the $Ba_2Ti_9O_{20}$ composition, calcined materials should be treated with an acid solution or after firing, the fired bodies should be treated over long periods of time in an oxygen gas atmosphere, in order to improve the dielectric properties. The Q values of the thus obtained dielectric ceramics have been reported to be on the order of 4200 at 10 GHz, wherein Q is the reciprocal of dielectric loss tan δ, i.e., $Q=1/\tan \delta$ [refer to "$Ba_2Ti_9O_{20}$ as a Microwave Dielectric Resonator" J. K. Plourde, D. F. Linn, H. M. O'Bryan, John Thomson Jr., J. Am. Ceram. Soc., 58 (9-10) pp. 418-420 (1975) and "A New $BaO-TiO_2$ compound with Temperature-Stable High Permittivity and Low Microwave Loss," H. M. O'Bryan, John Thomson Jr., and J. K. Plourde, J. Am. Ceram. Soc., 57 (10) pp. 450-53(1974)]. However, for practical use of the $Ba_2Ti_9O_{20}$ dielectric ceramics as resonators, further improvements have been required in the Q values.

Further, with respect to the dielectric ceramic with the $BaTi_4O_9$ composition, it has been reported that it has a Q value of 2500 at 11 GHz ["New Low Loss High-K Temperature-Compensated Dielectric for Microwave Application", D. J. Masse, et al., Proceedings of the IEEE 59 (11), pp. 1628-29 (1971)] and a further improved Q value has been required. Further, in the use, for dielectric resonators, the $BaTi_4O_9$ dielectric ceramic has an unfavorably large temperature coefficient of resonant frequency, $\tau_f$, of +15 to 20 ppm/°C.

The perovskite type dielectric ceramics need the use of large quantities of expensive $Nb_2O_5$ and $Ta_2O_5$ and thereby the production cost is increased.

SUMMARY OF THE INVENTION

It is therefore an object of the present invention to overcome the foregoing problems encountered in the prior art and, more specifically, to provide a dielectric ceramic composition having a high Q and a small temperature coefficient of resonant frequency, $\tau_f$.

In our previous U.S. patent application Ser. No. 860,617, filed May 7, 1986 (based on Japanese Patent Application No. 60-237 457), we now U.S. Pat. No. 4,749,669 have proposed a dielectric ceramic having a superior microwave properties of a high Q and a low $\tau_f$, the ceramic consisting essentially of a $BaO-TiO_2-WO_3$ ternary system composition and, optionally, $ZrO_2$ and/or MnO. The present Inventors have made a further investigation on the $BaO-TiO_2-WO_3$ ternary system dielectric ceramic composition and found in strictly controlled ceramic compositions that dielectric ceramics with further improved dielectric properties can be achieved by a special compositional range which is based on the $BaO-TiO_2-WO_3$ ternary system, as referred to in the foregoing our Patent Application but has molar ratio ranges of the constituents different from those of the U.S. Application.

In the new compositional range, Q values are at the same level as those of the U.S. patent application Ser. No. 860,617 now U.S. Pat. No. 4,749,669 but, in comparison with other known $BaO-TiO_2$ system ceramic compositions, the Q values are high. Further, the new compositional range provides a properly low dielectric constant ($\epsilon r=20-35$). In applications at high frequencies in the microwave range, when the dielectric constant is too high, the size of resonators become too small and difficulties are presented in handling them. For such a reason, dielectric ceramics having a low dielectric constant (e.g., 20-35) are demanded. In addition, the new compositions have sufficiently small $\tau_f$ values and the $\tau_f$ values can be discretionally adjusted in the vicinity of 0 ppm/°C.

The present invention is to provide a dielectric ceramic consisting mainly of three components of BaO, $TiO_2$ and $WO_3$ and, if necessary, containing MnO as an additive. More specifically, the dielectric ceramic according to present invention is so designed that the composition consists basically of a combination of crystallized phases selected from $BaTi_4O_9$, $Ba_2Ti_9O_{20}$, $BaWO_4$ and $TiO_2$ and, as examples of such there may be obtained $BaTi_4O_9-BaWO_4$, $BaTi_4O_9-Ba_2Ti_9O_{20}-BaWO_4$, $Ba_2Ti_9O_{20}-BaWO_4$, $Ba_2Ti_9O_{20}-BaWO_4-TiO_2$. According to the present invention, the dielectric ceramic has a ternary system composition represented by the formula:

wherein a, b and C are molar proportions and $20 \leq a \leq 40$, $30 \leq b \leq 78.5$ and $0 < c < 33$ and, more specifically, the composition of the present invention is within the range enclosed by a line joining the points A, B, C, D, E and A of a composition diagram shown in the attached drawing in which compositions lying on a line joining A, E and D are excluded from range, because they are claimed in our previous application above mentioned. In other words, the dielectric ceramic of the present invention has a $BaO-TiO_2-WO_3$ ternary system composition consisting essentially of BaO, $TiO_2$ and $WO_3$ within the molar percent range joining the points of A(21.5, 78.5, 0), B(40.0, 30.0, 30.0), C(37.0, 30.0, 33.0), D(20.0, 75.0, 5.0), E(21.5, 75.0, 3.5) and A shown in FIGURE, in which compositions laying on the line joining A, E, D are excluded. In such a specified compositional range, it is preferable that $WO_3$ be contained at least 0.1 mole %. As necessary, the dielectric ceramic composition may further include up to 3 mole % MnO with respect to 100 mole % of the sum of BaO, $TiO_2$ and $WO_3$. Further, 10 mol % or less of $TiO_2$ may be substituted by tetravalent metal oxide(s) which can dissolve as a solid solution when used as a substitute for the $TiO_2$ component and examples of such a tetravalent oxide include $ZrO_2$ and $SnO_2$. Since the area defined by lines joining the points A, E, D, F (17.0, 78.5, 5.0), G(17.0, 83.0, 0) and A on the left side of a line connecting the points A, E and D is the region claimed in our previous patent application Ser. No. 860,617, this region is excluded from the range claimed in the present application in order to avoid overlapping.

BRIEF DESCRIPTION OF THE DRAWING

The drawing is a $BaO$-$TiO_2$-$WO_3$ ternary composition diagram in mole % and the area enclosed by a line connecting the points of A, B, C, D, E and A, but excluding compositions lying on the line joining A, E and D, is the compositional range claimed in claim the present invention.

DETAILED DESCRIPTION OF THE PREFERRED EMBODIMENTS

In the preparation of the dielectric ceramic composition of the present invention, the starting materials for the components of BaO and $TiO_2$ may be any materials which have been widely used in capacitors for use at lower frequencies than microwave frequencies and those materials are inexpensive. The $WO_3$ component is added to these two components to provide the composition as specified above and, thereby, high Q dielectric ceramics can be obtained by a simple process and in a low production cost. In the composition of the present invention, the $WO_3$ component is preferably contained in amounts of at least 0.1 mole %.

The reason why the dielectric ceramic composition of the present invention is limited as specified above is that in the region outside a line joining the points A and B and a line joining the points B and C, shown in the drawing, high Q can not be achieved and dense ceramics can not be successfully obtained after firing. Further, the range outside a line joining the points C and D results in a reduction of Q values.

MnO promotes the densification of the ceramic material during firing and, as effects on the properties, provides improved Q values and makes possible slight adjustments for $\tau_f$. The reason why the addition of MnO is limited up to 3 mole % is that MnO addition exceeding 3 mole % reduces Q values.

The ceramics of the present invention can be obtained in a conventional production manner and any extra or special step or operation is not required. The starting materials of the ceramics are not limited only to oxides. Any known materials, for example, carbonates such as $BaCO_3$ and $MnCO_3$, may be usually used, as long as they can ultimately yield oxide sintered bodies.

The starting materials are weighed corresponding to the intended composition, wet-mixed together with pure water in a polyethylene pot containing alumina balls, and then dried. The dried materials are calcined in an alumina crucible at a temperature of 1000° to 1200° C. for 1 to 6 hours. The calcination process is carried out in an oxidizing atmosphere, such as air or oxygen. The calcined materials are wet-milled in pure water using a polyethylene pot containing alumina balls, dried and molded under pressure. The molded samples are sintered on a setter made of zirconia or platinum at 1350° to 1420° C. for 2 to 6 hours in an oxidizing atmosphere such as oxygen or air.

This invention will now be illustrated in more detail with reference to the following Examples.

EXAMPLES $BaCO_3$, $TiO_2$, $WO_3$ and $MnCO_3$ were used as raw materials and dielectric ceramics were prepared in the same procedure as described above. The dielectric ceramics thus obtained were measured for the dielectric constant, $\epsilon_r$, and Q values at 5.5–6.5 GHz and $\tau_f$ over the temperature range of −25° C. to +75° C.

Table 1 shows the compositional proportions (by mole %) and the results of the measurements.

Example Nos. 1 through 6 have compositions lying on the line connecting $BaTi_4O_9$ and $BaWO_4$ shown in the drawing and, as noted from the following Table 1, the $\tau_f$ decreases as composition closes toward the $BaWO_4$ composition, and $\tau_f$ near 0 ppm/°C. can be obtained. Further, the Q values are on the order of at least 5000 at 6 GHz and higher than prior art $BaO$-$TiO_2$ system compositions. For example, the Q of the foregoing $Ba_2Ti_9O_{20}$ reported by O'Bryan, et al. is on the order of 8000 at 4 GHz and this Q value is equivalent to 5000 at 6 GHz.

Further, the $\epsilon_r$ values have been found to be of the order of 22 to 33 and small. Comparative Example No. 3 shows that when composition is above the line connecting the points A and B, shown in the drawing, the Q value is decreased.

Comparative Example No. 4 shows that fully densified fired bodies can not be obtained when ceramic compositions are brought toward the $BaWO_4$ composition and lie beyond the line joining the points B and C. Example Nos. 7 to 9 have compositions lying on the line joining between $Ba_2Ti_9O_{20}$ and $BaWO_4$. From the experimental data of these specimens, as compositions are brought closer to the $BaWO_4$ composition, the temperature characteristic, $\tau_f$, becomes smaller. Consequently, negative $\tau_f$ values which can not be obtained in the conventional compositions of $BaO$-$TiO_2$ system may be achieved.

Further, the dielectric ceramics of the present invention exhibit high Q values of at least 5000 at 6 GHz as compared to those of conventional compositions. It can be seen that the $\epsilon_r$ is at low levels of 29 to 33. Example No. 10 not containing MnO is inferior in Q as compared to Example No. 1 containing MnO in an amount of 0.1 mole %. However, an excess addition of MnO will produced deterious effects. For example, in Example No. 11 with MnO addition of 2 mole %, Q was reduced and, in Comparative Example No. 1 with MnO addition of 4 mole %, Q excessively lowered below the levels contemplated by the present invention. Comparative Example No. 2 indicates that compositions beyond the line connecting the points C and D result in reduction of the Q values.

The dielectric ceramic compositions of the present invention were examined by X-ray diffraction analysis and it has been found that compositions on the line joining the compositions of $BaTi_4O_9$ and $BaWO_4$ consist basically of $BaTi_4O_9$ and $BaWO_4$ and, on the other hand compositions on the line joining $Ba_2Ti_9O_{20}$ and $BaWO_4$ consist basically of $Ba_2Ti_9O_{20}$ and $BaWO_4$. Compositions between these two lines, namely, in the hatched zone shown in the drawing consist basically of crystallized phases of $BaTi_4O_9$, $Ba_2Ti_9O_{20}$ and $BaWO_4$. Further, compositions closer to $TiO_2$ than the line joining $Ba_2Ti_9O_{20}$ and $BaWO_4$ consist basically of crystallized phases of $Ba_2Ti_9O_{20}$, $BaWO_4$ and $TiO_2$.

TABLE 1

| | Composition (by mole %) | | | | Properties | | |
|---|---|---|---|---|---|---|---|
| | BaO | $TiO_2$ | $WO_3$ | MnO | $\epsilon r$ | Q | $\tau_f$ |
| Examples | | | | | | | |
| 1 | 22.73 | 72.73 | 4.54 | 0.1 | 32.4 | 9500 | 10 |
| 2 | 24.39 | 68.29 | 7.32 | 0.1 | 30.9 | 10000 | 7 |
| 3 | 26.32 | 63.16 | 10.52 | 0.1 | 29.2 | 9700 | 4 |
| 4 | 28.57 | 57.14 | 14.29 | 0.1 | 28.3 | 11000 | 4 |
| 5 | 31.25 | 50.00 | 18.75 | 0.1 | 27.5 | 10000 | 3 |
| 6 | 38.46 | 30.77 | 30.77 | 0.1 | 23.7 | 5400 | −3 |
| 7 | 22.47 | 70.79 | 6.74 | 0.1 | 32.5 | 9000 | −5 |
| 8 | 24.39 | 65.85 | 9.76 | 0.1 | 30.8 | 5700 | −8 |
| 9 | 26.67 | 60.00 | 13.33 | 0.1 | 29.8 | 6100 | −13 |
| 10 | 22.73 | 72.73 | 4.54 | — | 32.0 | 9000 | 10 |
| 11 | 22.73 | 72.73 | 4.54 | 2 | 32.0 | 8400 | 15 |
| Comparative Examples | | | | | | | |
| 1 | 22.73 | 72.73 | 4.54 | 4 | 31.5 | 3200 | 11 |
| 2 | 24.81 | 59.03 | 16.06 | 0.1 | 28 | 1900 | — |
| 3 | 35.04 | 42.96 | 21.90 | 0.1 | 19.5 | 3800 | — |
| 4 | 40.82 | 24.49 | 34.69 | 0.1 | unmeasured because of unsintered bodies | | |

Further dielectric ceramics, Example Nos. 12–14 and Comparative Example No. 5 were obtained in the same procedure set forth above in which $TiO_2$ was partially replaced with $ZrO_2$ or $SnO_2$. For the thus obtained ceramics, dielectric properties were examined and the results are given in Table 2 below. According to the experimental data, when this partial replacement with the tetravalent metal oxide exceeds 10 mole % of $TiO_2$, such an excessive replacement results in deterioration of Q values and is unfavorable. Further, microstructural studies indicated that Zr ions or Sn ions dissolve as a solid solution in sites normally occupied by Ti ions and any new crystallized phase is not formed due to the partial replacement of $TiO_2$ with $ZrO_2$ and $SnO_2$.

TABLE 2

| | Composition (by mole %) | | | | | | Properties | | |
|---|---|---|---|---|---|---|---|---|---|
| | BaO | $TiO_2$ | $WO_3$ | MnO | $ZrO_2$ | $SnO_2$ | $\epsilon r$ | Q | $\tau_f$ |
| Examples | | | | | | | | | |
| 12 | 22.73 | 69.09 | 4.54 | 0.1 | 3.64 | — | 32.0 | 9200 | 9 |
| 13 | 22.73 | 66.91 | 4.54 | 0.1 | 5.82 | — | 31.3 | 9000 | 7 |
| 14 | 22.73 | 69.09 | 4.54 | 0.1 | — | 3.64 | 31.8 | 9000 | 9 |
| Comparative Examples | | | | | | | | | |
| 5 | 22.73 | 61.82 | 4.54 | 0.1 | 10.91 | — | 26.0 | 3000 | 5 |

As described above, the dielectric ceramic composition according to the present invention can be obtained without requiring any special step and has great merits that high Q, properly small dielectric constant and sufficiently reduced temperature coefficient of resonant frequency, $\tau_f$, can be simultaneously obtained and the $\tau_f$ can be adjusted to a desired value in the vicinity of 0 ppm/°C. Further, since the dielectric ceramics of the present invention also have satisfactory electrical properties for use at low frequencies, it can be provide usefulness for temperature-compensating capacitors.

What is claimed is:

1. A dielectric ceramic composition consisting essentially of a $BaO$-$TiO_2$-$WO_3$ ternary system wherein the molar percentages of BaO, $TiO_2$ and $WO_3$ are within the area defined by straight lines joining the points A(21.5, 78.5, 0), B(40.0, 30.0, 30.0), C(37.0, 30.0, 33.0), D(20.0, 75.0, 5.0), E(21.5, 75.0, 3.5) and A, in that order, in the composition diagram, in mole %, shown in the attached drawing, with the proviso that said molar percentages of BaO, $TiO_2$ and $WO_3$ laying on the straight lines joining said points A, E and D, in that order, are excluded, and wherein the amount of $WO_3$ contained in the composition is at least 0.1 mole %.

2. A dielectric ceramic composition as claimed in claim 1 in which up to 10 mole % of $TiO_2$ is replaced by tetravalent metal oxide.

3. A dielectric ceramic composition as claimed in claim 2 in which said tetravalent metal oxide is $ZrO_2$ and/or $SnO_2$.

4. A dielectric ceramic composition consisting essentially of a $BaO$-$TiO_2$-$WO_3$ ternary system wherein the molar percentages of BaO, $TiO_2$, and $WO_3$ are within the area defined by straight lines joining the points A(21.5, 78.5, 0), B(40.0, 30.0, 30.0), C(37.0, 30.0, 33.0), D(20.0, 75.0, 5.0), E(21.5, 75.0, 3.5) and A, in that order, in the composition diagram, in mole %, shown in the attached drawing, with the proviso that said molar percentages of BaO, $TiO_2$ and $WO_3$ laying on the straight lines joining said points A, E and D, in that order, are excluded, said composition containing up to 3 mole % of MnO, based on the sum of the number of moles of BaO, $TiO_2$ and $WO_3$ being 100 mole %, and wherein the amount of $WO_3$ contained in the composition is at least 0.1 mole %.

5. A dielectric ceramic composition as claimed in claim 4 in which up to 10 mole % of $TiO_2$ is replaced by tetravalent metal oxide.

6. A dielectric ceramic composition as claimed in claim 5 in which said tetravalent metal oxide is $ZrO_2$ and/or $SnO_2$.

7. A dielectric ceramic composition as claimed in claim 1 in which said ternary system contains more than 5.0 mole % of $WO_3$.

8. A dielectric ceramic composition as claimed in claim 1 in which said ternary system contains from 6.74 to 30.77 mole % of $WO_3$.

9. A dielectric ceramic composition as claimed in claim 1 in which said ternary system contains less than 75.0 mole % of $TiO_2$.

10. A dielectric ceramic composition as claimed in claim 1 in which said ternary system contains from 30.77 to 72.73 mole % of $TiO_2$.

11. A dielectric ceramic composition as claimed in claim 4 in which said ternary system contains more than 5.0 mole % of $WO_3$.

12. A dielectric ceramic composition as claimed in claim 4 in which said ternary system contains from 6.74 to 30.77 mole % of $WO_3$.

13. A dielectric ceramic composition as claimed in claim 4 in which said ternary system contains less than 75.0 mole % of $TiO_2$.

14. A dielectric ceramic composition as claimed in claim 4 in which said ternary system contains from 30.77 to 72.73 mole % of $TiO_2$.

* * * * *